(12) United States Patent
Henkensmeier et al.

(10) Patent No.: US 10,236,527 B2
(45) Date of Patent: Mar. 19, 2019

(54) POROUS NAFION MEMBRANE AND METHOD FOR PREPARING THE SAME

(71) Applicant: KOREA INSTITUTE OF SCIENCE AND TECHNOLOGY, Seoul (KR)

(72) Inventors: Dirk Henkensmeier, Seoul (KR); Dickson Joseph, Seoul (KR); Jong Hyun Jang, Seoul (KR); Jin Young Kim, Seoul (KR); Hyoung-Juhn Kim, Seoul (KR); Jonghee Han, Seoul (KR); Suk Woo Nam, Seoul (KR); Sung Pil Yoon, Seoul (KR)

(73) Assignee: Korean Institute of Science and Technology, Seoul (KR)

( * ) Notice: Subject to any disclaimer, the term of this patent is extended or adjusted under 35 U.S.C. 154(b) by 495 days.

(21) Appl. No.: 14/983,439

(22) Filed: Dec. 29, 2015

(65) Prior Publication Data

US 2016/0204459 A1    Jul. 14, 2016

(30) Foreign Application Priority Data

Jan. 13, 2015 (KR) ........................ 10-2015-0006089

(51) Int. Cl.
*H01M 8/1023* (2016.01)
*H01M 8/1039* (2016.01)
(Continued)

(52) U.S. Cl.
CPC ....... *H01M 8/1023* (2013.01); *H01M 8/1039* (2013.01); *H01M 8/1053* (2013.01);
(Continued)

(58) Field of Classification Search
CPC ............ B32B 2255/10; B32B 2255/26; B32B 2307/204; B32B 23/048; B32B 2457/18; B32B 27/08; H01M 8/1039
See application file for complete search history.

(56) References Cited

U.S. PATENT DOCUMENTS 6,524,736 B1  2/2003  Sompalli et al.
9,522,427 B2  12/2016 Dirk Henkensmeler et al.
(Continued)

FOREIGN PATENT DOCUMENTS

EP   1 1521830 B1   1/2009
JP   08-14176 A     6/1996
(Continued)

OTHER PUBLICATIONS

Oscar W. Reif, Microfiltration Membranes: Characteristics and Manufacturing, Adv Biochem Engin/Biotechnol, 2006, vol. 98, pp. 73-103, German.
(Continued)

*Primary Examiner* — Alexandre F Ferre
(74) *Attorney, Agent, or Firm* — Goldilocks Zone IP Law

(57) ABSTRACT

Provided are a method for preparing a Nafion membrane having a through-pore free monolithic porous structure throughout the bulk of the membrane through a one-step process very easily and a Nafion membrane having a through-pore free monolithic porous structure obtained from the method. The Nafion membrane having such a porous structure may have an increased surface area, and thus may improve the membrane/catalyst interfacial area and transport characteristics.

11 Claims, 24 Drawing Sheets

(51) Int. Cl.
H01M 8/1053 (2016.01)
H01M 8/1067 (2016.01)
H01M 8/1081 (2016.01)
(52) U.S. Cl.
CPC ....... *H01M 8/1067* (2013.01); *H01M 8/1081* (2013.01); *H01M 2300/0082* (2013.01); *Y02P 70/56* (2015.11)

(56) References Cited

U.S. PATENT DOCUMENTS

| 2004/0159544 | A1* | 8/2004 | Bocarsly | H01M 8/1023 |
| | | | | 204/296 |
| 2012/0115049 | A1 | 5/2012 | Rinzler et al. | |
| 2013/0181677 | A1 | 7/2013 | Kourtakis et al. | |
| 2013/0323496 | A1 | 12/2013 | Henkensmeier et al. | |

FOREIGN PATENT DOCUMENTS

| KR | 10-0327096 B1 | 12/2000 |
| KR | 10-2006-0083375 A | 7/2006 |
| KR | 10-2007-0014679 A | 2/2007 |
| KR | 10-2008-0039615 A | 5/2008 |
| KR | 10-0860552 B1 | 5/2008 |
| KR | 10-2013-0135558 A | 12/2013 |
| KR | 10-1358940 B1 | 12/2013 |
| KR | 10-1494289 B1 | 2/2015 |
| WO | 2011038190 A1 | 3/2011 |

OTHER PUBLICATIONS

Shin et al., Effect of the catalytic ink preparation method on the performance of polymer electrolyte membrane fuel cells, Journal of Power sources, 2002, pp. 146-152, vol. 106, Elsevier.
Krishnan et al., Sulfonated poly(ether sulfone)-based silica nanocomposite membranes for high temperature polymer electrolyte fuel cell applications, International Journal of Hydrogen energy, Apr. 8, 2011, pp. 7152-7161, vol. 36, Elsevier.
Lee et al., The Electrochemical Properties of the porous Naflon Membrane for Proton Exchange Membrane Fuel Cell (PEMFCs), Bull Korean Chem. Soc., 2012, pp. 1788-1790, vol. 33, No. 5.
An Office Action from the USPTO dated Dec. 26, 2014, in a co-pending U.S. Appl. No. 13/796,083, now U.S. Pat. No. 9,522,427.
A Final Office Action from the USPTO dated May 1, 2015, in a co-pending U.S. Appl. No. 13/796,083, now U.S. Pat. No. 9,522,427.
An Interview Summary from the USPTO dated Aug. 5, 2015, in a co-pending U.S. Appl. No. 13/796,083, now U.S. Pat. No. 9,522,427.
An Advisory Action from the USPTO dated Aug. 17, 2015, in a co-pending U.S. Appl. No. 13/796,083, now U.S. Pat. No. 9,522,427.
An Office Action from the USPTO dated Nov. 10, 2015, in a co-pending U.S. Appl. No. 13/796,083, now U.S. Pat. No. 9,522,427.
A Final Office Action from the USPTO dated Mar. 4, 2016, in a co-pending U.S. Appl. No. 13/796,083, now U.S. Pat. No. 9,522,427.
Min-Kyu Song et al., Incorporation of Zirconium Hydrogen Phosphate into Porous Ionomer Membranes, Electrochemical and Solid-State Letters, Apr. 5, 2004, pp. A127-A130, vol. 7.
J. F Whitacre, et al., Enhanced catalyst utilization in PEM fuel cells via ultrafast laser modification of the polymer exchange membrane surface, Electrochemistry Communications, 2009, pp. 655-659, vol. 11, Elsevier.
Q. K. Dang et al., "Nafion membranes with a porous surface", Journal of Membrane Science, Mar. 12, 2014, pp. 199-205, vol. 460, Elsevier.
Se Kyu Park et al., "Characteristics of Membrane Humidifiers for Polymer Electrolyte Membrane Fuel Cells", Korean Journal of Chemical Engineering, Nov. 2005, pp. 877-881, vol. 22.
Sang Yeop Lee et al., "Development of a 600 W Proton Exchange Membrane Fuel Cell Power System for the Hazardous Mission Robot", Journal of Fuel Cell Science and Technology, Mar. 11, 2010, pp. 031006-1-031006-7, vol. 7.
N. M. Vargas-Barbosa et al., "Assessing the Utility of Bipolar Membranes for use in Photoelectrochemical Water-Splitting Cells", ChemSusChem, Sep. 25, 2014, pp. 3017-3020, vol. 7.
M. B. McDonald et al., "Use of Bipolar Membranes for Maintaining Steady-State pH Gradients in Membrane- Supported, Solar-Driven Water Splitting", ChemSusChem, Sep. 22, 2014, , pp. 3021-3027, vol. 7.
M. Ünlü et al., "Hybrid Anion and Proton Exchange Membrane Fuel Cells", The Journal of Phyical Chemistry C, 2009, pp. 11416-11423, vol. 113.
M. Ünlü et al., "Self Humidifying Hybrid Anion-Cation Membrane Fuel Cell Operated Under Dry Conditions", Fuel Cells, 2010, pp. 54-63, vol. 10.
M. B. McDonald et al., "Graphene Oxide as a Water Dissociation Catalyst in the Bipolar Membrane Interfacial Layer", ACS Applied Materials & Interfaces, Jul. 21, 2014, pp. 13790-13797, vol. 6.
D.-J. Guo et al., "A highly porous nafion membrane templated from polyoxometalates-based supramolecule composite for ion-exchange polymer-metal composite actuator", Journal of Materials Chemistry, 2010, pp. 10159-10168, vol. 20.
J. A. Hestekin et al., "Modified porous Nafion®: Membrane characterization and two-phase separations", J.Membr. Sci., Apr. 18, 2006, pp. 268-273, vol. 281.
D. Henkensmeier et al.,"ortho-Dichlorobenzene as a pore modifier for PEMFC catalyst electrodes and dense Nafion membranes with one porous surface", Journal of Materials Chemistry, 2012, pp. 14602-14607, vol. 22.
Jaeyoung Lee et al., "Moisture Absorption Characteristics of Pt/Nafion Membrane for PEMFC Prepared by a Drying Process", Hydrogen and New Energy Society, Aug. 2012, pp. 310-315,vol. 23.

* cited by examiner

POROUS NAFION MEMBRANE AND METHOD FOR PREPARING THE SAME

CROSS-REFERENCE TO RELATED APPLICATION

This application claims priority to Korean Patent Application No. 2015-006089, filed on Jan. 13, 2015, and all the benefits accruing therefrom under 35 U.S.C. § 119, the contents of which in its entirety are herein incorporated by reference.

BACKGROUND

1. Field

The present disclosure relates to a porous Nafion membrane and a method for preparing the same very easily through a one-step process. The porous Nafion membrane may be used in various industrial fields, such as fuel cells, gas separators, electrolytic cells, redox flow batteries, humidifiers and sensors, and a method for preparing the same.

2. Description of the Related Art

Fuel cells are power generating systems that may produce electric energy through an electrochemical reaction of hydrogen as a fuel and oxygen as an oxidant. Such fuel cells may be classified into various types, including polymer electrolyte membrane fuel cells (PEMFC) and direct methanol fuel cells (DMFC), based on driving temperature, or the like.

Fuel cells use an electrolyte membrane. The electrolyte membrane is made of a polymer material having proton conductivity, and serves not only as a channel through which protons generated by the oxidation at an anode move toward a cathode but also as an insulating membrane by which the anode and cathode are separated electrically from each other.

A typical example of currently available electrolyte membranes is a sulfonated tetrafluoroethylene membrane, i.e., NAFION® electrolyte membrane, available from Dupont Co. Meanwhile, such a Nafion electrolyte membrane may be also used in a humidified system.

A porous Nafion membrane may significantly improve a quality of a fuel cell and enhances a resistance against delamination of a membrane electrode.

The porous Nafion membrane may be prepared by a leaching process, extraction process, high-temperature process or a high-pressure process according to the related art. However, according to observations of the inventors, such processes for preparing a porous Nafion membrane are very complicated, have a difficulty in developing a uniform porous structure, and provide through-pores (e.g. see EP 1152380).

Meanwhile, the inventors of the present disclosure have suggested a method for preparing a Nafion membrane having a porous surface layer and a dense lower layer (US 20130323496).

The above-mentioned method, however, is limited to a preparation of a Nafion membrane having a porous layer only at the surface layer. With the method, it is not possible to form a monolithic porous structure throughout the bulk of the Nafion membrane including the lower part of the surface layer, because pores rise toward the surface during the evaporation of a solvent and no pores are formed in the part below the surface.

SUMMARY

In one aspect, the present disclosure is directed to providing a method for preparing a porous Nafion membrane by which the porous Nafion membrane may be obtained very easily through a simple single-step process.

In another aspect, the present disclosure is also directed to providing a porous Nafion membrane having a unique porous structure which is obtained through a solvent evaporation process and developed well throughout the bulk of the Nafion membrane.

According to some example embodiments, there is provided a method for preparing a porous Nafion membrane through a solvent evaporation process, the method including preparing a casting solution by adding a non-solvent to a Nafion dispersion containing Nafion and a solvent, and applying the casting solution to a substrate, and evaporating the solvent, wherein the casting solution contains 9-12 parts by weight of a non-solvent based on 100 parts by weight of a Nafion and solvent mixture including 8-12 wt % of Nafion and 88-92 wt % of a solvent; the solvent is an alcohol alone or a mixture of an alcohol with water; the alcohol is ethanol, isopropanol (IPA), 1-propanol (1-PA), butanol or a mixture thereof; and water is present in the mixture of an alcohol with water in an amount greater than 0 wt % and equal to or less than 15 wt % based on 100 wt % of the mixture of an alcohol with water.

According to an example embodiment, the solvent has a boiling point lower than the boiling point of the non-solvent.

According to another example embodiment, the non-solvent is o-dichlorobenzene, m-dichlorobenzene, p-dichlorobenzene, naphthalene or alpha-naphthol.

According to still another example embodiment, the casting solution includes 10-11 parts by weight of the non-solvent based on 100 parts by weight of the mixture of Nafion with a solvent containing 9.5-10.5 wt % of Nafion and 89.5-90.5 wt % of a solvent.

According to still another example embodiment, the alcohol is ethanol, a mixture of ethanol with 1-propanol, or a mixture of ethanol with isopropanol, and water is present in the mixture of an alcohol with water in an amount of 5 wt % or less based on 100 wt % of the mixture of an alcohol with water.

According to still another example embodiment, Nafion has an ion exchange capacity (or equivalent weight, EW) of 1100±50.

According to still another example embodiment, the casting solution further includes additives in an amount greater than 0 parts by weight and up to 15 parts by weight based on 100 parts by weight of Nafion.

According to still another example embodiment, the additive is an inorganic material of metal or metal oxide; organometallic compound; or a mixture thereof.

According to still another example embodiment, the additive is at least one selected from the group consisting of $TiO_2$, $SiO_2$, $CeO_2$, Pt, Pd, copper (II) phthalocyanin tetrasulfonic acid and copper (II) phthalocyanin tetrasulfonic acid tetrasodium salt.

According to still another example embodiment, the method further includes forming an ion conductive polymer membrane on the porous Nafion membrane.

According to yet another example embodiment, the ion conductive polymer membrane may be a second Nafion membrane having an ion exchange capacity different from the ion exchange capacity of Nafion in the porous Nafion membrane, sulfonated or non-sulfonated hydrocarbon-based polymer membrane such as sulfonated polysulfone or PBI membrane, or an anion conductive polymer membrane.

According to some exampled embodiments, there is provided a porous Nafion membrane, wherein a surface and a whole inner part of the Nafion membrane consists of a monolithic porous structure and the monolithic porous structure is a through-pore free structure.

According to an example embodiment, the porous Nafion membrane has a uniform porous structure free from giant pores, wherein open pores are distributed on both surfaces and closed pores are distributed inner part of the membrane.

According to another example embodiment, all pores of the monolithic porous structure show a pore size deviation within +100% and −98% from average pore size of the monolithic porous structure.

According to still another example embodiment, the porous structure has the largest pore diameter (LPD) not exceeding twice of the 90% average pore diameter ($APD_{90}$).

According to still another example embodiment, the porous structure has pores less than 20% of which are connected and 80% or more of which are not connected but separated from each other.

According to still another example embodiment, the porous Nafion membrane is able to maintain its membrane shape without any distortion of its membrane shape.

According to still another example embodiment, the porous Nafion membrane is an opaque white membrane.

According to still another example embodiment, the porous structure is obtained by a solvent evaporation process.

According to still another example embodiment, the porous Nafion membrane may further include an additive that is an inorganic material of metal or metal oxide; organometallic compound; or a mixture thereof.

According to still another example embodiment, the additive is at least one selected from the group consisting of $TiO_2$, $SiO_2$, $CeO_2$, Pt, Pd, copper (II) phthalocyanin tetrasulfonic acid and copper (II) phthalocyanin tetrasulfonic acid tetrasodium salt.

According to still another example embodiment, the Nafion membrane may further include an ion conductive polymer membrane formed thereon.

According to still another example embodiment, the ion conductive polymer membrane may be a second Nafion membrane having an ion exchange capacity different from the ion exchange capacity of the Nafion in the porous Nafion membrane, sulfonated or non-sufonated hydrocarbon-based polymer membrane such as sulfonated polysulfone or PBI membrane or an anion conductive polymer membrane.

According to yet another example embodiment, the Nafion membrane may be used for a fuel cell, sensor, electrolytic cell, redox flow batteries, gas separator or a humidifier.

According to the embodiments of the present disclosure, it is possible to obtain a porous Nafion membrane very easily through a simple single-step process. It is also possible to provide a porous Nafion membrane having a unique through-pore free structure formed by a solvent evaporation process and developed well throughout the bulk of the Nafion membrane. The porous Nafion membrane having such a porous structure may have an increased surface area, and thus may improve the membrane/catalyst interfacial area and transport characteristics.

BRIEF DESCRIPTION OF THE DRAWINGS

The above and other aspects, features and advantages of the disclosed exemplary embodiments will be more apparent from the following detailed description taken in conjunction with the accompanying drawings in which:

FIG. 1a-1c show scanning electron microscopy (SEM) images of the Nafion membrane obtained by using a non-solvent in an amount of 150 mg/mL according to Example 1, wherein FIG. 1a shows the air-side surface, FIG. 1b shows the section, FIG. 1c shows the substrate (glass)-side surface.

FIG. 2a-2c show SEM images of the Nafion membrane obtained by using a non-solvent in an amount of 100 mg/mL according to Comparative Example 1, wherein FIG. 2a shows the air-side surface, FIG. 2b shows the section, and FIG. 2c shows the substrate (glass)-side surface.

FIG. 3a-3c show SEM images of the Nafion membrane obtained by using a non-solvent in an amount of 200 mg/mL according to Comparative Example 2, wherein FIG. 3a shows the air-side surface, FIG. 3b shows the section, and FIG. 3c shows the substrate (glass)-side surface.

FIG. 4a-4c show SEM images of the Nafion membrane obtained by using a non-solvent in an amount of 130 mg/mL according to Example 2, wherein FIG. 4a shows the air-side surface, FIG. 4b shows the section, and FIG. 4c shows the substrate (glass)-side surface.

FIG. 5a-5c show SEM images of the Nafion membrane obtained by using a non-solvent in an amount of 170 mg/mL according to Example 3, wherein FIG. 5a shows the air-side surface, FIG. 5b shows the section, and FIG. 5c shows the substrate (glass)-side surface.

FIG. 6a-6c show SEM images of the Nafion membrane obtained according to Example 4, wherein FIG. 6a shows the air-side surface, FIG. 6b shows the section, and FIG. 6c shows the substrate (glass)-side surface.

FIG. 7a-7c show SEM images of the Nafion membrane obtained according to Example 5, wherein FIG. 7a shows the air-side surface, FIG. 7b shows the section, and FIG. 7c shows the substrate (glass)-side surface.

DETAILED DESCRIPTION

Figure 1A:
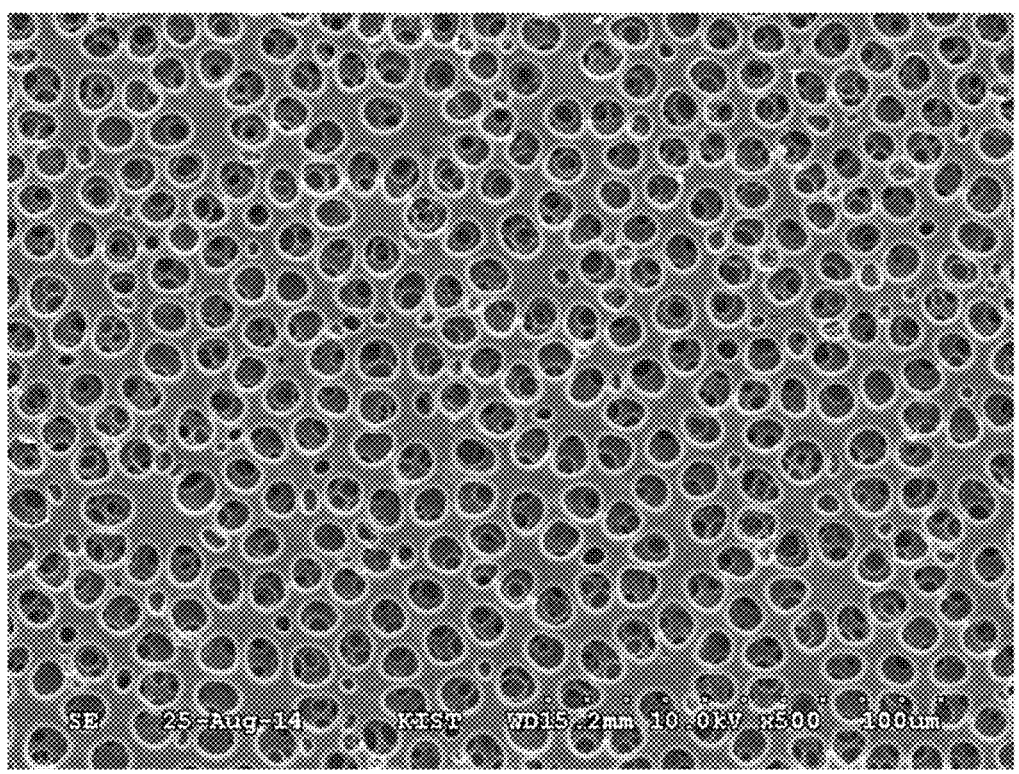

Exemplary embodiments are described more fully hereinafter. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the description, details of features and techniques may be omitted to more clearly disclose exemplary embodiments.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments will be described in detail with reference to the accompanying drawings.

As used herein, 'through-pore structure' means a pore structure including through-pores, wherein 'through-pore' means a pore that can pass through a membrane along the pore path.

As used herein, the expression 'pores are fully connected' refers to a formation of through-pores in a membrane through a connection of individual pores.

As used herein, 'through-pore free structure' means a structure having no through-pores, contrary to the through-pore structure. In such a through-pore free structure, pores may be partially connected but do not fully connected to form through-pores.

As used herein, the expression 'pores are connected' means that pores are not separated from each other but attached to each other.

As used herein, 'distortion' of a membrane shape means that the membrane is torn or deformed so that it may not maintain its shape.

As used herein, 'uniform pore structure' means a structure in which pores having a substantially uniform diameter are developed uniformly throughout the bulk of the membrane without any giant pores having a size significantly larger than the other pores, for example, as determined by the SEM images of the air-side surface, substrate-side surface and section of a porous Nafion membrane.

According to some embodiments, there is suggested a very simple and easy method for preparing a Nafion, i.e. perfluorinated sulfonic acid polymer (hereinafter, Nafion) membrane having a uniform monolithic porous structure not only on the surface thereof but also in the whole part thereof including the lower (inner) part of the surface.

According to the above-mentioned method, it is possible to form a unique monolithic porous structure having a through-pore free structure throughout the bulk of the Nafion membrane by forming a casting solution having a specific composition when applying a solvent evaporation process.

In one aspect, there is provided a method for preparing a porous Nafion membrane through a solvent evaporation process, the method including preparing a casting solution by adding a non-solvent to a Nafion dispersion containing Nafion and a solvent, and applying the casting solution to a substrate, followed by evaporating the solvent, wherein the casting solution contains 9-12 parts by weight of a non-solvent based on 100 parts by weight of a Nafion/solvent mixture including 8-12 wt % of Nafion and 88-92 wt % of a solvent. Herein, the solvent is an alcohol alone or a mixture of an alcohol with water. In addition, the alcohol is ethanol, isopropanol (IPA), 1-propanol (1-PA), butanol or a mixture thereof, and water is present in the mixture of an alcohol with water in an amount greater than 0 wt % and equal to or less than 15 wt % based on 100 wt % of the mixture of an alcohol with water.

Such a casting solution is different from the casting solution used for forming a porous layer only at the surface layer of a Nafion membrane as suggested earlier by the present inventors. According to some example embodiments, the casting solution specifically includes Nafion in an amount of 8-12 wt % and a solvent in an amount of 88-92 wt %, wherein 9-12 parts by weight of a non-solvent containing a desired alcohol is used based on 100 parts by weight of the corresponding solvent mixture, the non-solvent is free from water or includes water in an amount limited to 15 wt % or less, particularly 5 wt % or less of the solvent.

As a result, it has been found that a unique monolithic porous layer having the pore structure as described hereinafter is formed throughout the bulk of the membrane.

According to an example embodiment, the solvent has a boiling point lower than the boiling point of the non-solvent.

According to another example embodiment, the non-solvent is o-dichlorobenzene, m-dichlorobenzene, p-dichlorobenzene, naphthalene or alpha-naphthol.

According to still another example embodiment, the Nafion for use in forming the Nafion membrane may have an ion exchange capacity (or equivalent weight, EW) of 1100±50. The Nafion having the above-defined range of ion exchange capacity is favorable to formation of a membrane having the porous structure disclosed herein.

According to still another example embodiment, as described hereinafter, the casting solution may include 10-11 parts by weight of a non-solvent based on 100 parts by weight of the mixture of Nafion with a solvent containing 9.5-10.5 wt % of Nafion and 89.5-90.5 wt % of a solvent in order to obtain a uniform pore structure free from through-pores throughout the bulk of the membrane and to maintain the membrane shape.

According to still another example embodiment, the casting solution may further include an additive in an amount greater than 0 parts by weight and up to 15 parts by weight based on 100 parts by weight of Nafion. Herein, the additive is an inorganic material and/or organometallic compound. The inorganic material may be a metal or metal oxide.

Particularly, the additive may be at least one selected from the group consisting of $TiO_2$, $SiO_2$, $CeO_2$, Pt, Pd, copper (II) phthalocyanin tetrasulfonic acid and copper (II) phthalocyanin tetrasulfonic acid tetrasodium salt.

For reference, when the porous Nafion membrane according to some example embodiments may be used for fuel cells or the like, traces of hydrogen ($H_2$) and oxygen ($O_2$) may pass through the membrane and may be bound to each other by the catalyst in the membrane to produce water (this is also referred to as self-humidifying). When pores are formed in a porous membrane as disclosed herein, the pores enhance gas crossover, resulting in increased production of water. Therefore, it is required to keep a balance in production of water. It is also required to improve mechanical stability, because formation of pores may cause degradation of mechanical stability.

Therefore, according to some example embodiments, the additives, such as an inorganic material or organometallic compound, may be incorporated to the membrane to assist keeping a balance in production of water and to improve mechanical stability. In addition, it is possible to increase conductivity and assist the function of a catalyst.

For example, a metal oxide, such as $TiO_2$, $SiO_2$ or $CeO_2$, does facilitate humidification of a membrane, and thus assists keeping a balance of water and improves mechanical stability. In the case of $CeO_2$ or the like, it is possible to break radicals (such as OH radicals) forming a catalytic addition reaction. In addition, copper (II) phthalocyanin tetrasulfonic acid or copper (II) phthalocyanin tetrasulfonic acid tetrasodium salt not only improves mechanical stability and conductivity but also imparts a catalytic function (the catalytic function of such an organometallic compound is lower than the catalytic function of a metal catalyst). A metal catalyst, such as Pd (e.g. Pd nanoparticles) or Pt (e.g. Pt nanoparticles) may be incorporated to a porous Nafion membrane and may function as a catalyst therein.

In another aspect, there is provided a porous Nafion membrane obtained by the above-described method.

Particularly, the Nafion membrane according to some example embodiments has a monolithic porous structure on the surface and in the whole inner part thereof, wherein the porous structure is a through-pore free structure having no through-pores. Open pores are distributed on both surface portions of the porous Nafion membrane, while closed pores are distributed inside the membrane.

According to an example embodiment, the porous structure may be a uniform porous structure. Such a uniform porous structure is free from giant pores and pores having a substantially uniform size may be distributed evenly throughout the bulk of the membrane (Pores are distributed to have an ordered structure throughout the bulk of the membrane, as shown in the pore structure images of the following Examples. On the contrary, as shown in the image of Comparative Example 2, Comparative Example 2 has a disordered structure having giant pores and non-uniformly distributed pores).

According to another example embodiment, all pores of the porous structure show a pore size deviation within +100% and −98% from average pore size (pore diameter) (i.e. all the pores are within average pore size +100% and −98%. For example, when average pore size is 10 μm, +100% means 20 μm)

According to still another example embodiment, the porous structure has the largest pore diameter (LPD) not exceeding twice of the 90% average pore diameter ($APD_{90}$) [i.e., LPD≤2 $APD_{90}$]. Herein, the 90% average pore diameter ($APD_{90}$) means an average pore diameter of lower (i.e. smaller size) 90% of pores, when the pores are ordered according to size. For reference, the pore size may be determined, for example, by an SEM image.

According to still another example embodiment, the porous structure has pores less than 20% of which are connected (e.g. less than 20 pores of 100 pores) and 80% or more of which are not connected but separated from each other (e.g. 80 or more pores of 100 pores).

According to still another example embodiment, the porous Nafion membrane may maintain its membrane shape without any distortion of its membrane shape. More particularly, the porous Nafion membrane may be an opaque white membrane. Herein, the porous Nafion membrane has no difference in degrees of haze as determined by the naked eyes.

As described above, the porous Nafion membrane having such a monolithic porous structure may be obtained by a solvent evaporation process.

According to an example embodiment, the porous Nafion membrane may further include an additive that is an inorganic material, such as metal or metal oxide, organometallic compound or a mixture thereof. Particular examples of such additives are the same as described above.

According to still another example embodiment, the Nafion membrane may further include a catalyst layer formed thereon.

According to still another example embodiment, the Nafion membrane may further include an ion conductive polymer membrane formed thereon.

According to still another example embodiment, the ion conductive polymer membrane may be another Nafion membrane having an ion exchange capacity different from the ion exchange capacity of Nafion in the porous Nafion membrane, sulfonated or non-sulfonated hydrocarbon-based polymer membrane such as sulfonated polysulfone or PBI membrane or an anion conductive polymer membrane.

The Nafion membrane according to some example embodiments may be used for a fuel cell, sensor, electrolytic cell, redox flow batteries, gas separator or a humidifier. Particularly, the porous Nafion membrane according to some example embodiments may be highly effective for humidifiers, as compared to the conventional Nafion membrane (For example, the porous Nafion membranes according to some example embodiments may be laminated and applied to humidifiers or the like). In addition, as described above, when additives, such as a catalyst, are incorporated to the casting solution to obtain a porous Nafion membrane containing the additives, the porous Nafion membrane may be particularly useful for self-humidifying fuel cells.

The examples and experiments will now be described. The following examples and experiments are for illustrative purposes only and not intended to limit the scope of the present disclosure. Various changes in form and details may be made without departing from the spirit and scope of the present disclosure as defined by the appended claims.

EXAMPLES AND COMPARATIVE EXAMPLES

A commercially available Nafion dispersion (DE2021; Dupont Co., 20% Nafion, 34% water and 44% 1-propanol) is subjected to solvent evaporation, and Nafion is dispersed again into ethanol. In other words, ethanol is added to Nafion from which the solvent is evaporated, followed by agitation at room temperature until a clear dispersion is obtained. The obtained Nafion dispersion is mixed with o-dichlorobenzene (referred to ODB hereinafter). ODB is used in an amount of 150 mg per mL of the dispersion in Example 1 (corresponding to 10.5 parts by weight of ODB based on 100 parts by weight of the dispersion), 130 mg per mL of the dispersion in Example 2 (corresponding to 9 parts by weight of ODB based on 100 parts by weight of the dispersion), 170 mg per mL of the dispersion in Example 3 (corresponding to 12 parts by weight of ODB based on 100 parts by weight of the dispersion), 100 mg per mL of the dispersion in Comparative Example 1, and 200 mg per mL of the dispersion in Comparative Example 2. Each of the three types of dispersions is cast onto a glass plate through doctor blading. It is observed that a membrane is formed as the solvent is evaporated.

Figure 1B:
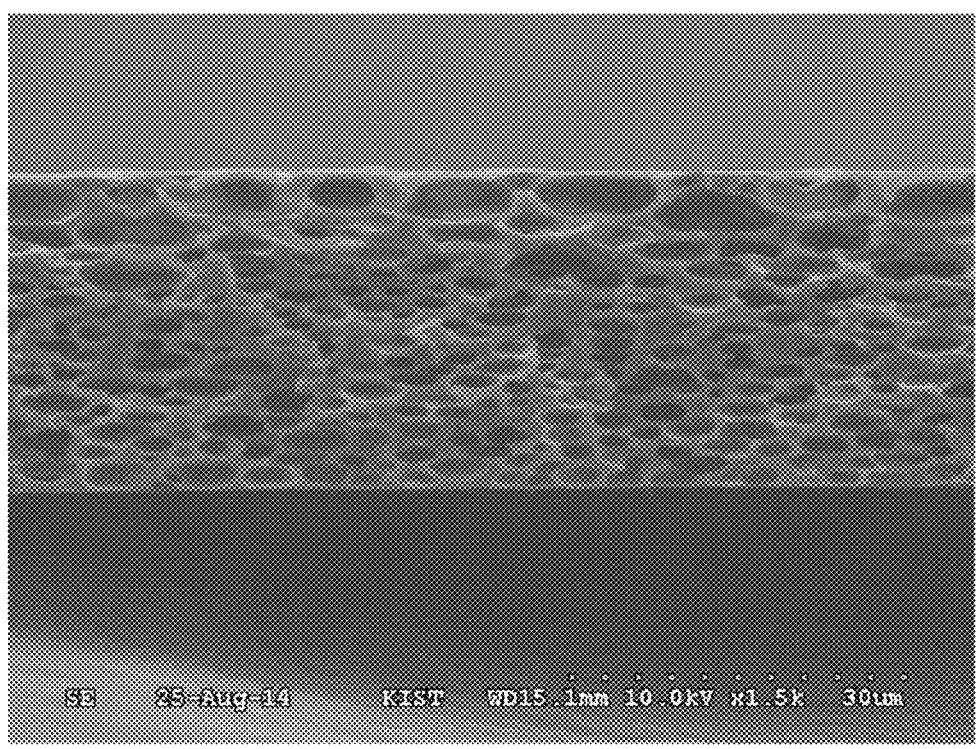
Figure 1C:
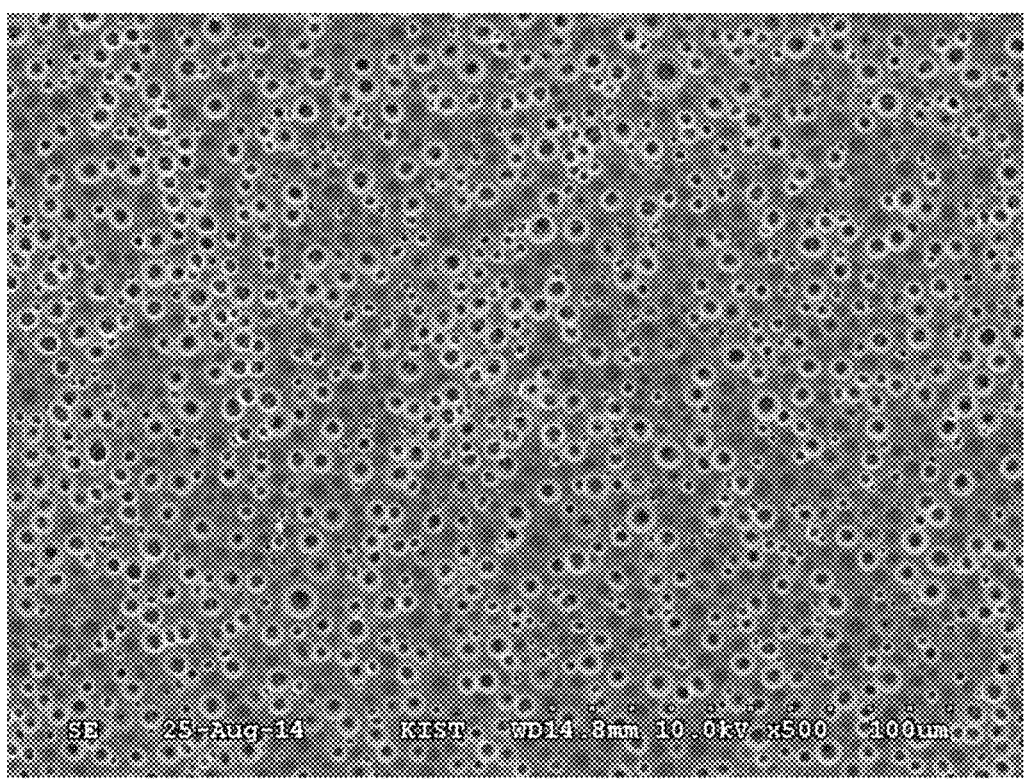
Figure 1D:
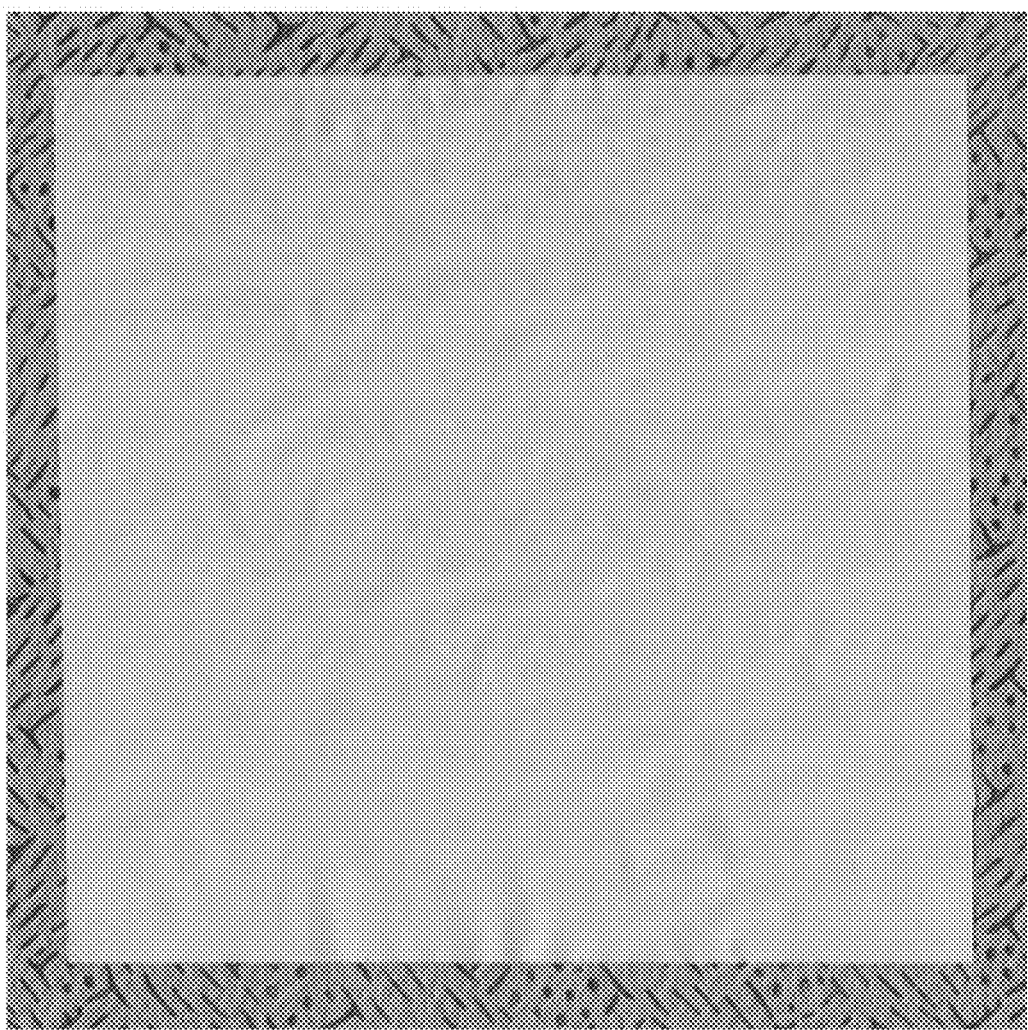
FIG. 1d is an actual photograph of the corresponding Nafion membrane.

FIG. 1a-1c show scanning electron microscopy (SEM) images of the Nafion membrane obtained by using a non-solvent in an amount of 150 mg/mL according to Example 1, wherein FIG. 1a shows the air-side surface, FIG. 1b shows the section, FIG. 1c shows the substrate (glass)-side surface, and FIG. 1d is the actual photograph of the corresponding Nafion membrane.

Figure 2A:
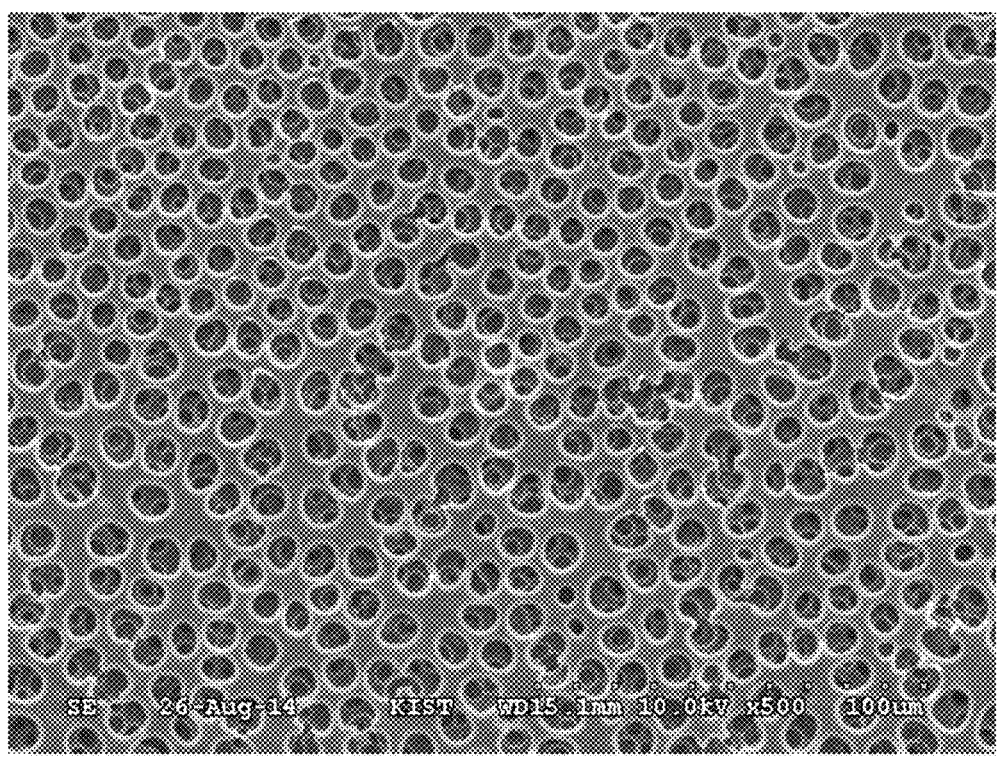
Figure 2B:
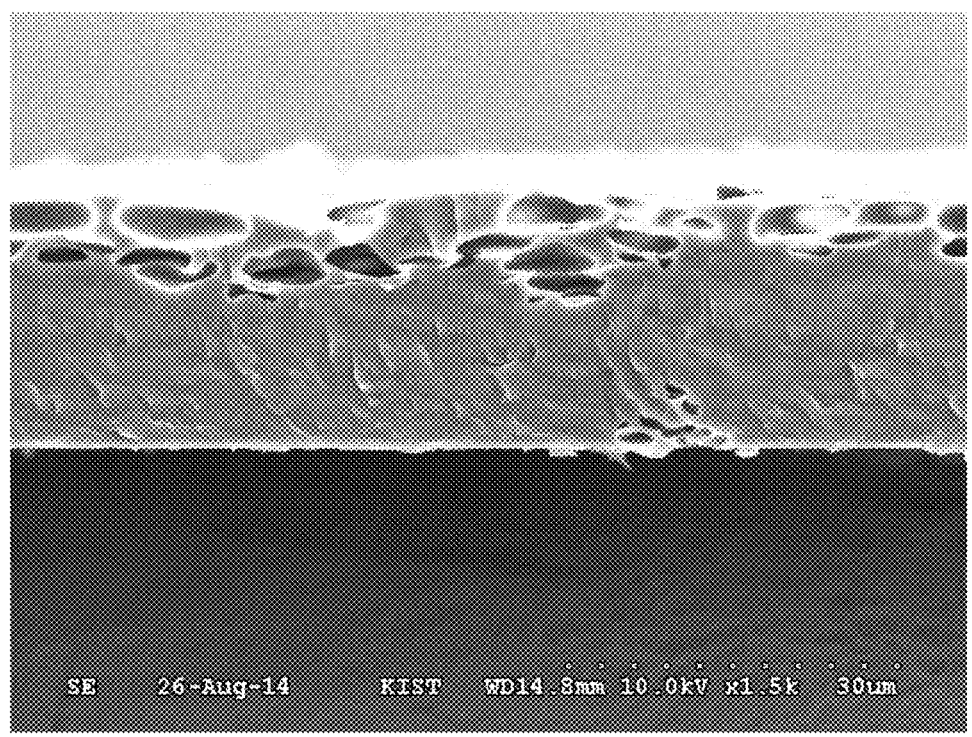
Figure 2C:
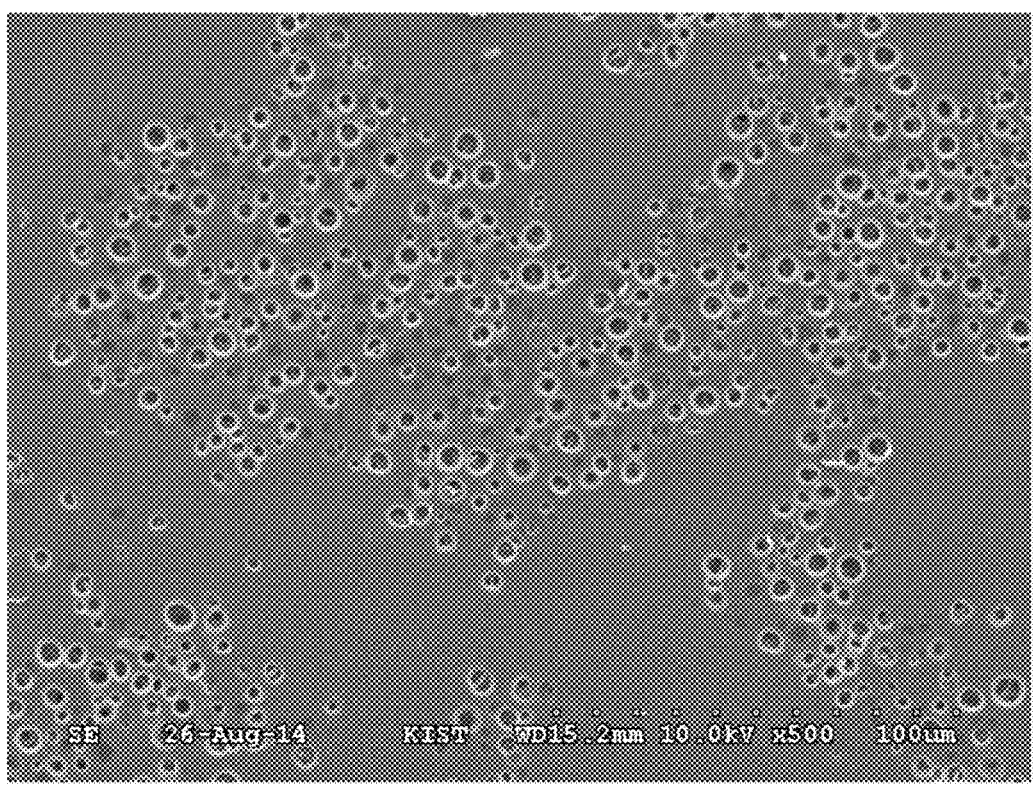

FIG. 2a-2c show SEM images of the Nafion membrane obtained by using a non-solvent in an amount of 100 mg/mL according to Comparative Example 1, wherein FIG. 2a shows the air-side surface, FIG. 2b shows the section, and FIG. 2c shows the substrate (glass)-side surface.

Figure 3A:
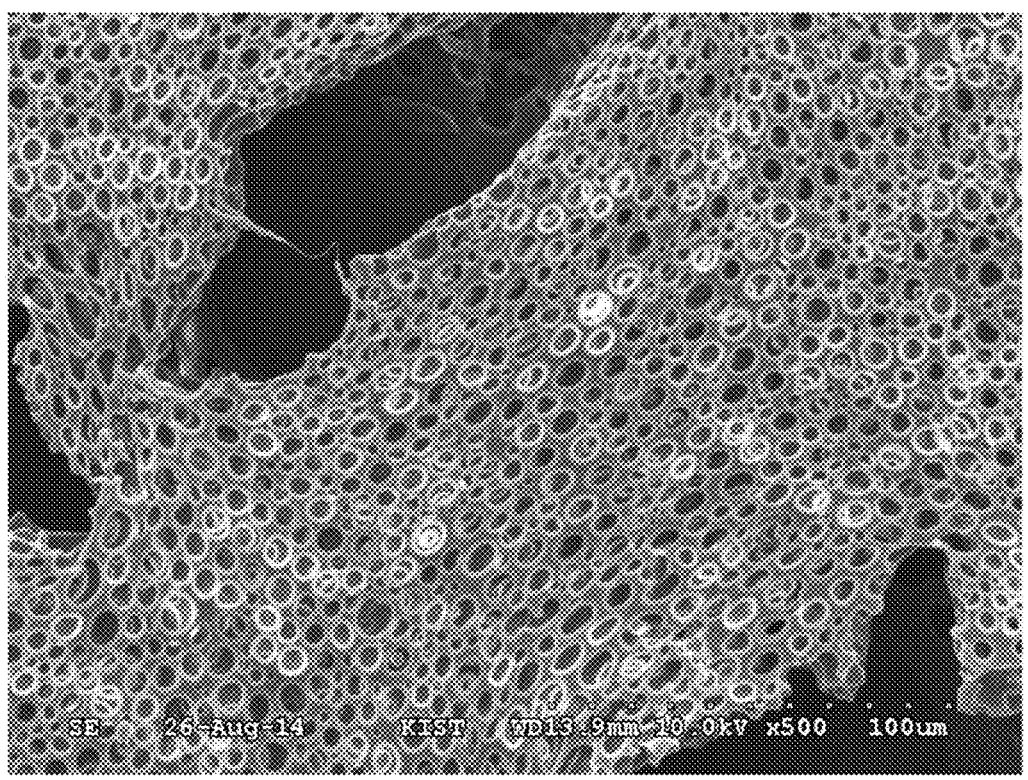
Figure 3B:
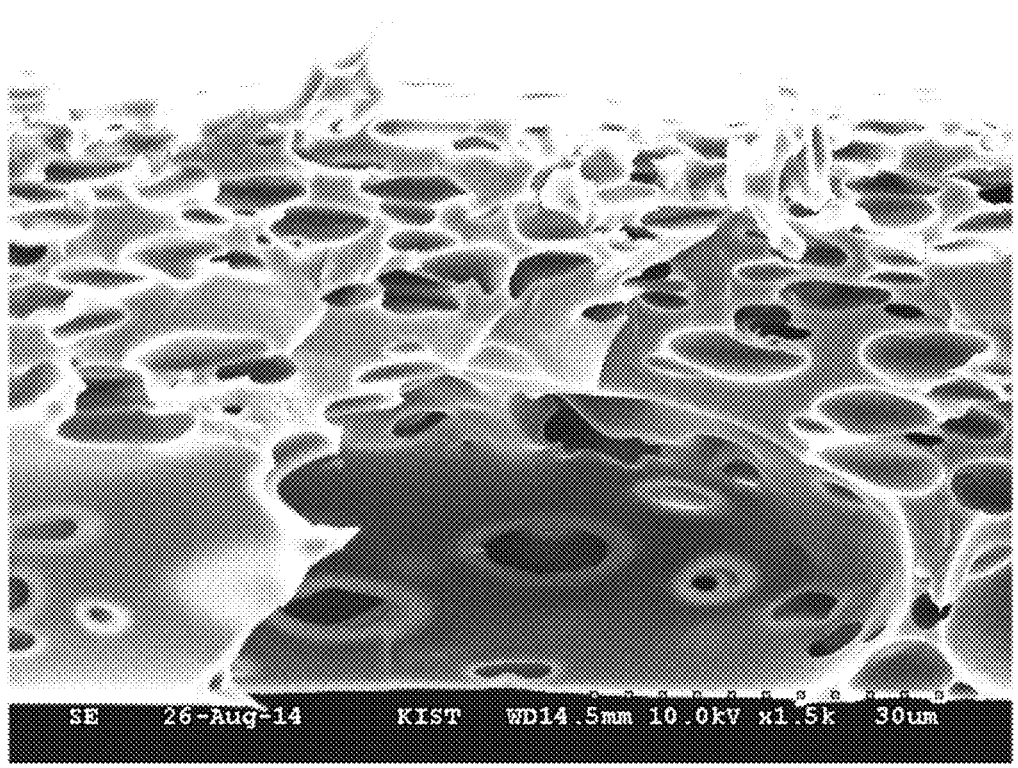
Figure 3C:
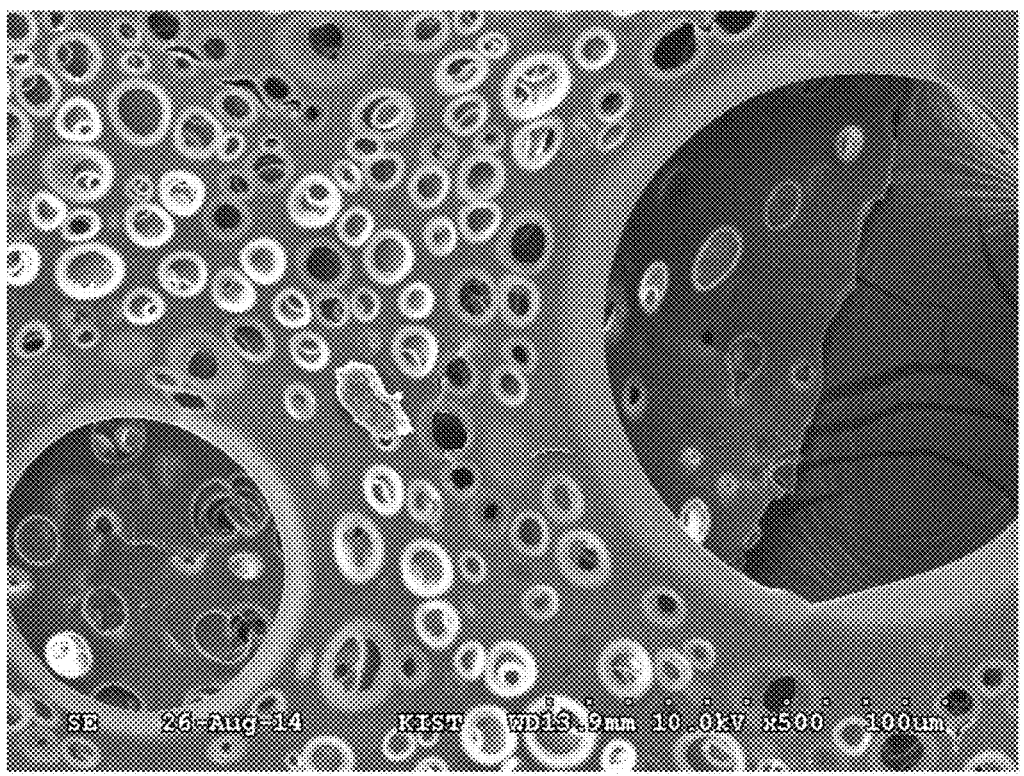

FIG. 3a-3c show SEM images of the Nafion membrane obtained by using a non-solvent in an amount of 200 mg/mL according to Comparative Example 2, wherein FIG. 3a shows the air-side surface, FIG. 3b shows the section, and FIG. 3c shows the substrate (glass)-side surface.

Figure 4A:
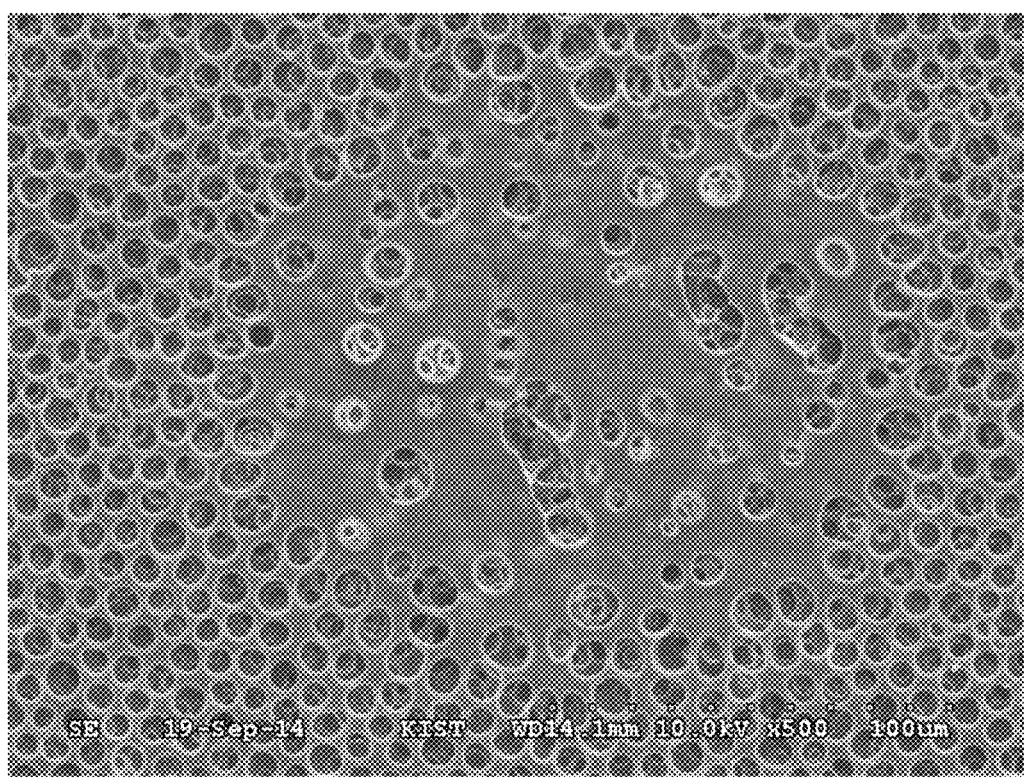
Figure 4B:
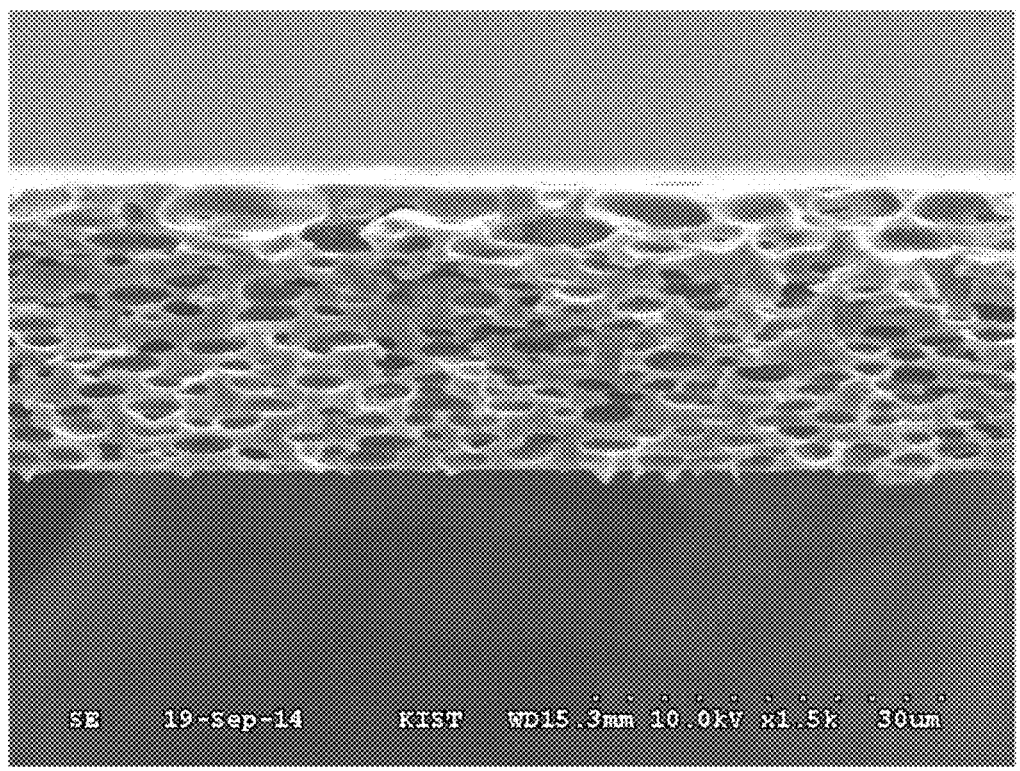
Figure 4C:
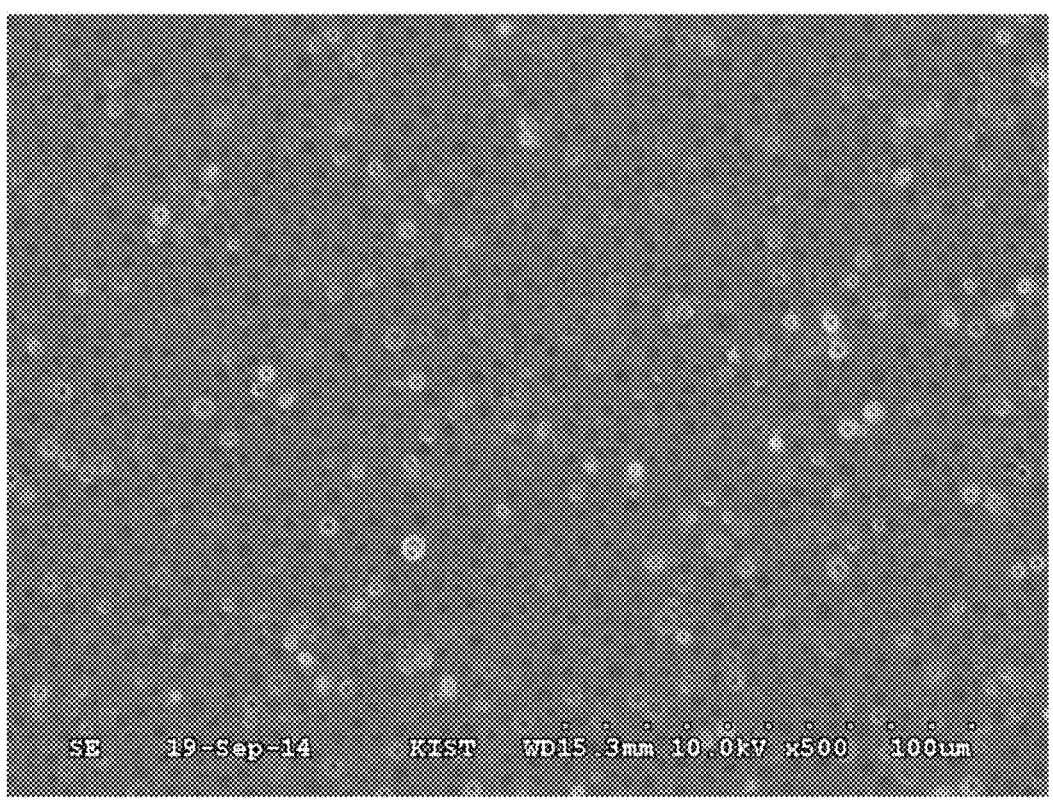

FIG. 4a-4c show SEM images of the Nafion membrane obtained by using a non-solvent in an amount of 130 mg/mL according to Example 2, wherein FIG. 4a shows the air-side surface, FIG. 4b shows the section, and FIG. 4c shows the substrate (glass)-side surface.

Figure 5A:
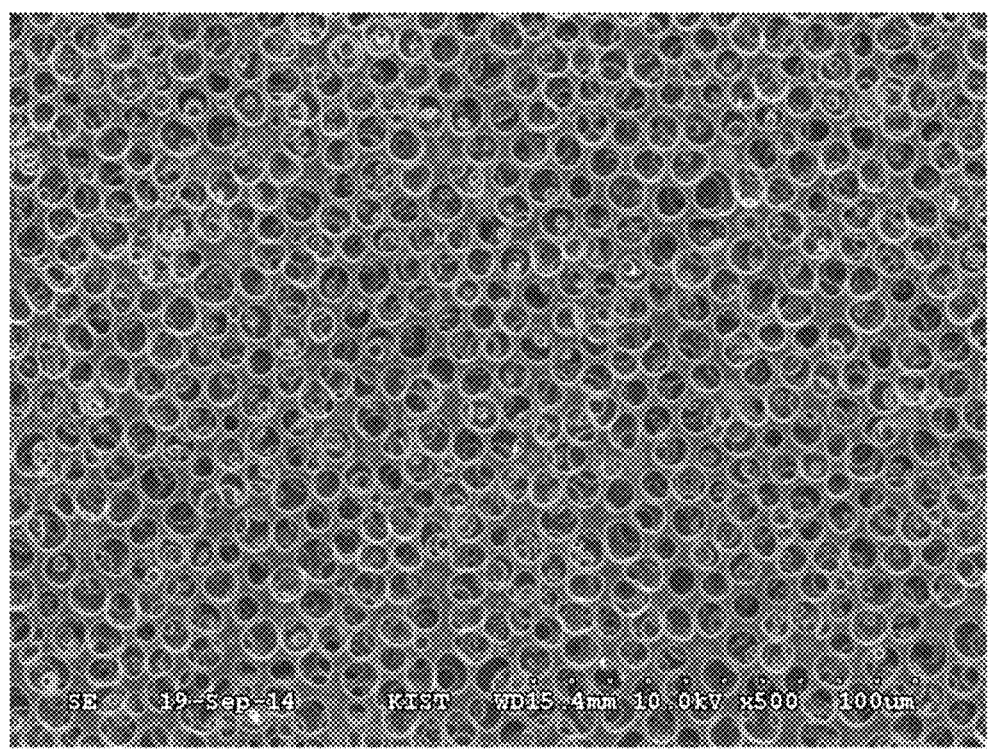
Figure 5B:
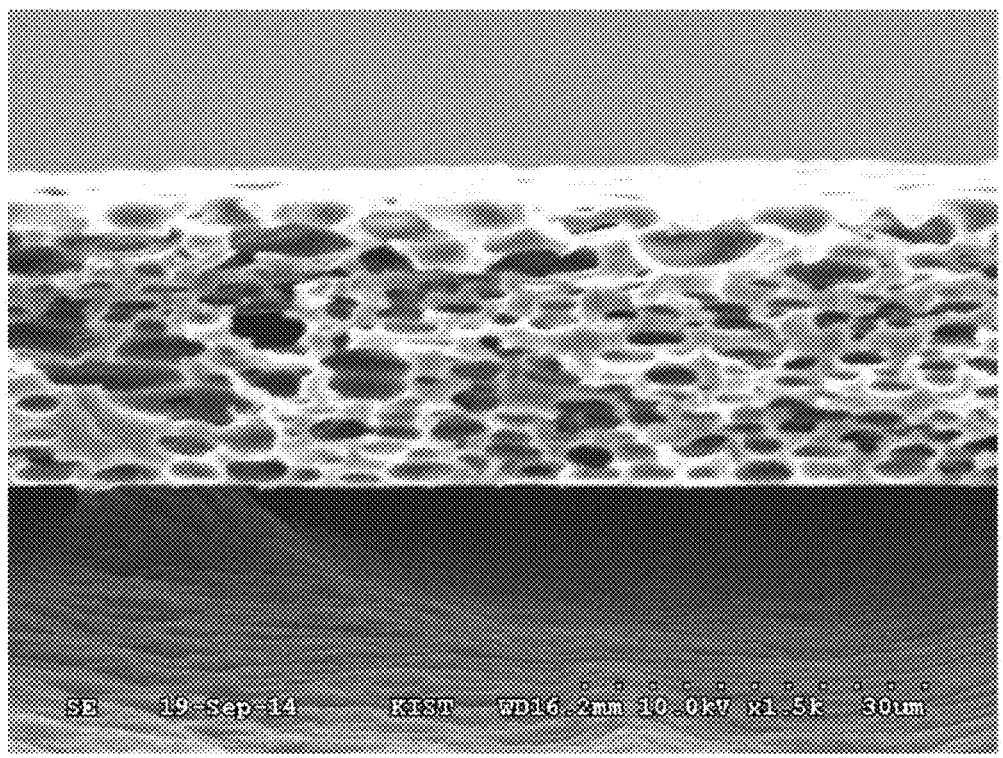
Figure 5C:
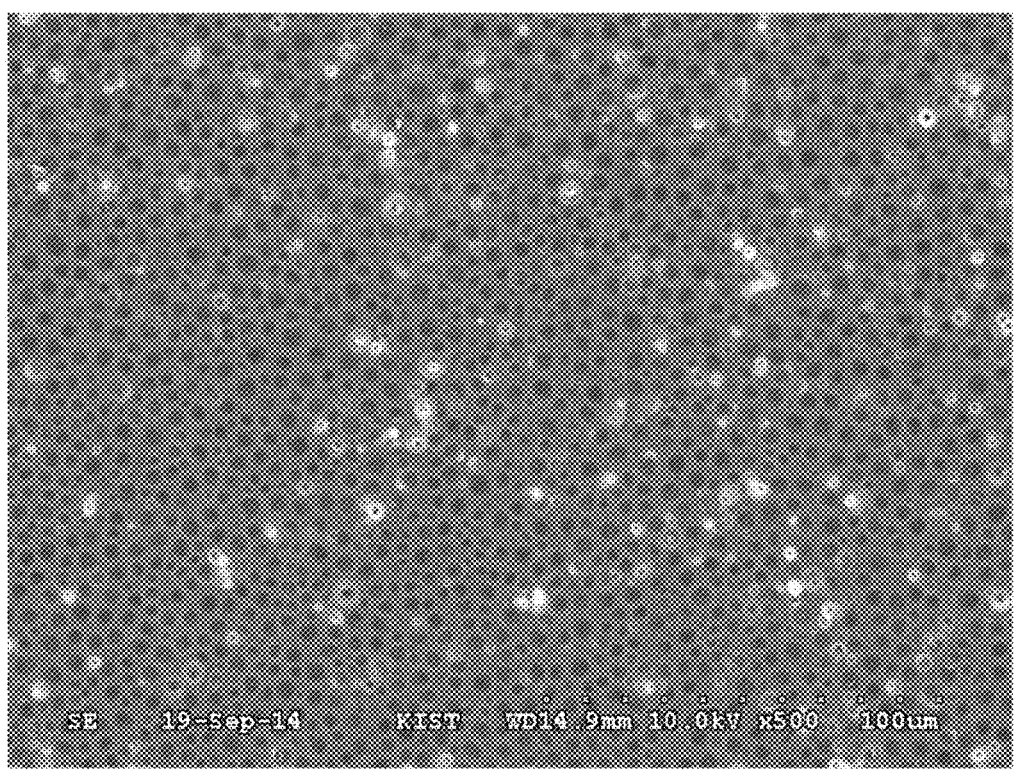

FIG. 5a-5c show SEM images of the Nafion membrane obtained by using a non-solvent in an amount of 170 mg/mL according to Example 3, wherein FIG. 5a shows the air-side surface, FIG. 5b shows the section, and FIG. 5c shows the substrate (glass)-side surface.

As shown in FIG. 1d, it is observed by the naked eyes that an opaque white membrane having no difference in degrees of haze is formed as the solvent is evaporated. The corresponding porous membrane maintains its membrane shape well. After the porous structure of the membrane is observed by SEM, it is shown that a porous structure is formed, and the porous structure includes pores having a uniform size distributed evenly therein and is free from through-pores (FIG. 1a-FIG. 1c).

Thus, a through-pore free structure is formed throughout the bulk of the Nafion membrane when adding an optimum concentration range of non-solvent (herein, ODB) is added to the Nafion dispersion. On the contrary, when the non-solvent is added in an amount less than or more than a predetermined range, a dense layer is formed at the lower part and pores are formed at the surface (see, FIG. 2: using an excessively small amount of non-solvent), or giant pores are observed and a through-pore structure having through-pores in a part thereof is formed (see, FIG. 3: using an excessively large amount of non-solvent). In addition, as shown in FIG. 3, when such through-pores are formed, the structure is not flexible but shows brittle characteristics.

Meanwhile, in the case of Example 2 using a non-solvent in an amount of 130 mg smaller than 150 mg (larger than 100 mg, which is used in Comparative Example 1 having a dense layer in the membrane), a portion having no pores is observed (see, FIG. 4a), but Example 2 shows a through-pore free structure as a whole (see, FIG. 4).

In addition, in the case of Example 3 using a non-solvent in an amount of 170 mg larger than 150 mg (smaller than 200 mg, which is used in Comparative Example 2 having through-pores in the membrane), the pore size is increased and the number of partially connected pores is also increased. However, Example 3 substantially has no through-pores and shows a through-pore free structure as a whole (see, FIG. 5). Further, as the amount of non-solvent increases, distortion such as tearing or deformation occurs in Example 3, and thus it is difficult for Example 3 to maintain its membrane shape.

Meanwhile, a change in type of solvent may result in a variation in pore structure.

In other words, n-propanol (1-propanol) is added to the Nafion dispersion dispersed in ethanol according to Example 1 in an amount of 10 parts by weight based on the weight of Nafion dispersion, and the remaining procedure is carried out in the same manner as Example 1 to obtain the membrane of Example 4.

In addition, isopropanol is added to the Nafion dispersion dispersed in ethanol according to Example 1 in an amount of 10 parts by weight based on the weight of Nafion dispersion, and the remaining procedure is carried out in the same manner as Example 1 to obtain the membrane of Example 5.

Figure 6A:
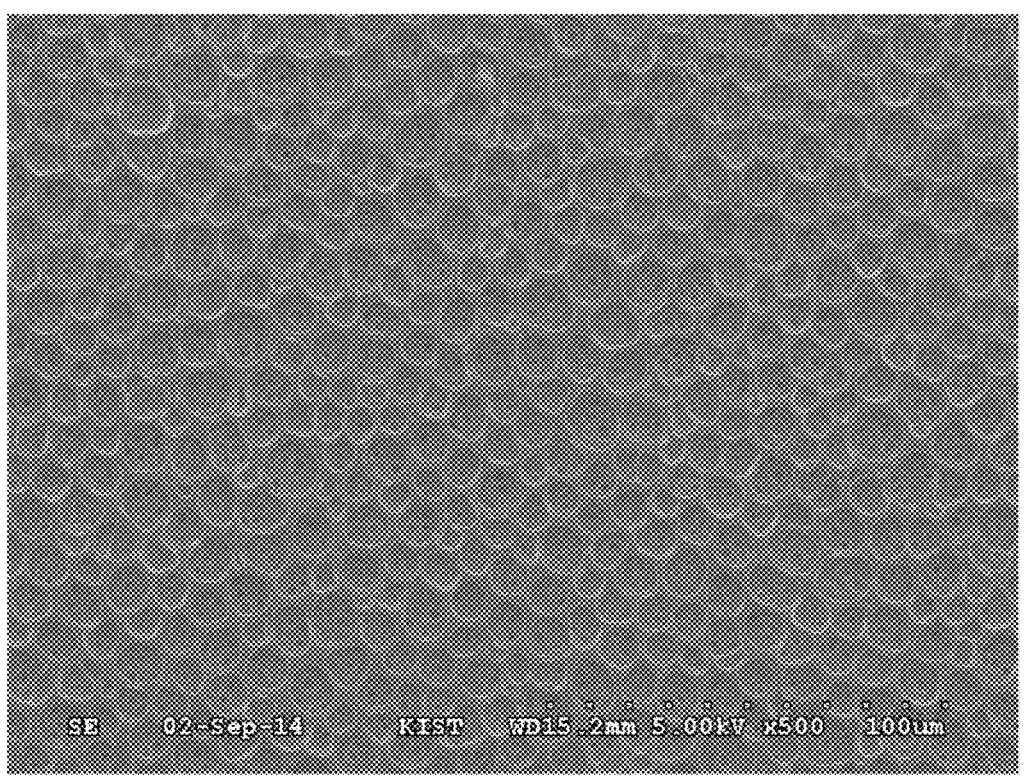
Figure 6B:
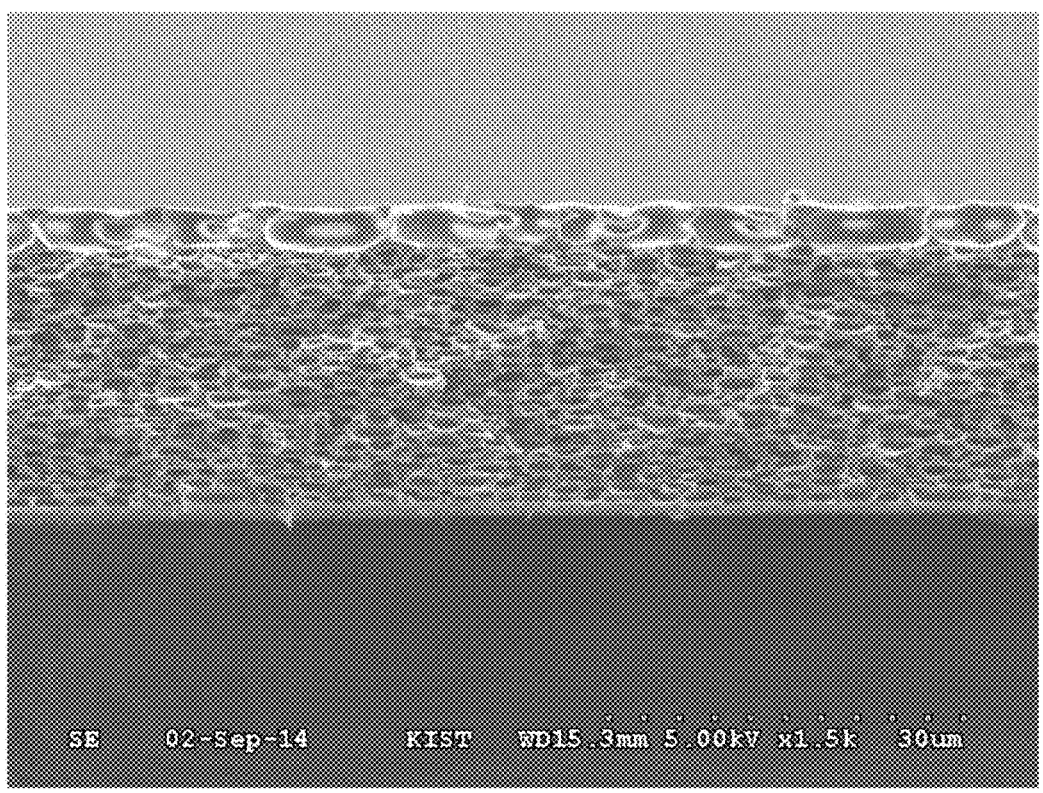
Figure 6C:
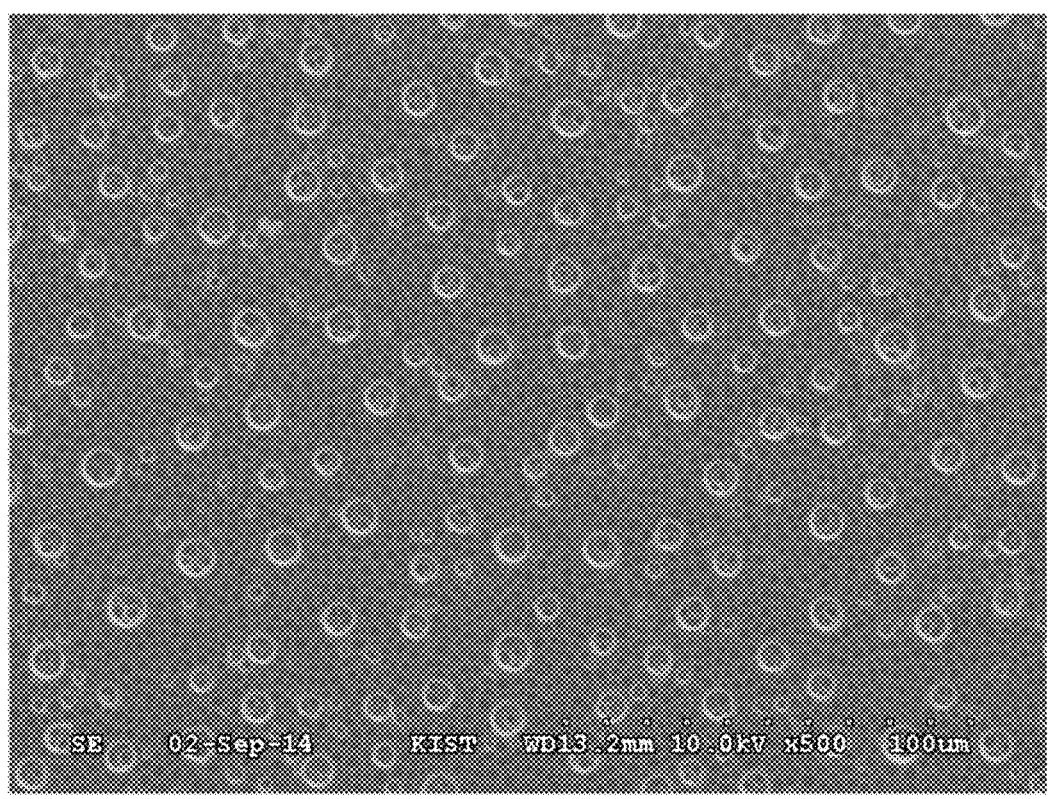

FIG. 6a-6c show SEM images of the Nafion membrane obtained according to Example 4, wherein FIG. 6a shows the air-side surface, FIG. 6b shows the section, and FIG. 6c shows the substrate (glass)-side surface.

Figure 7A:
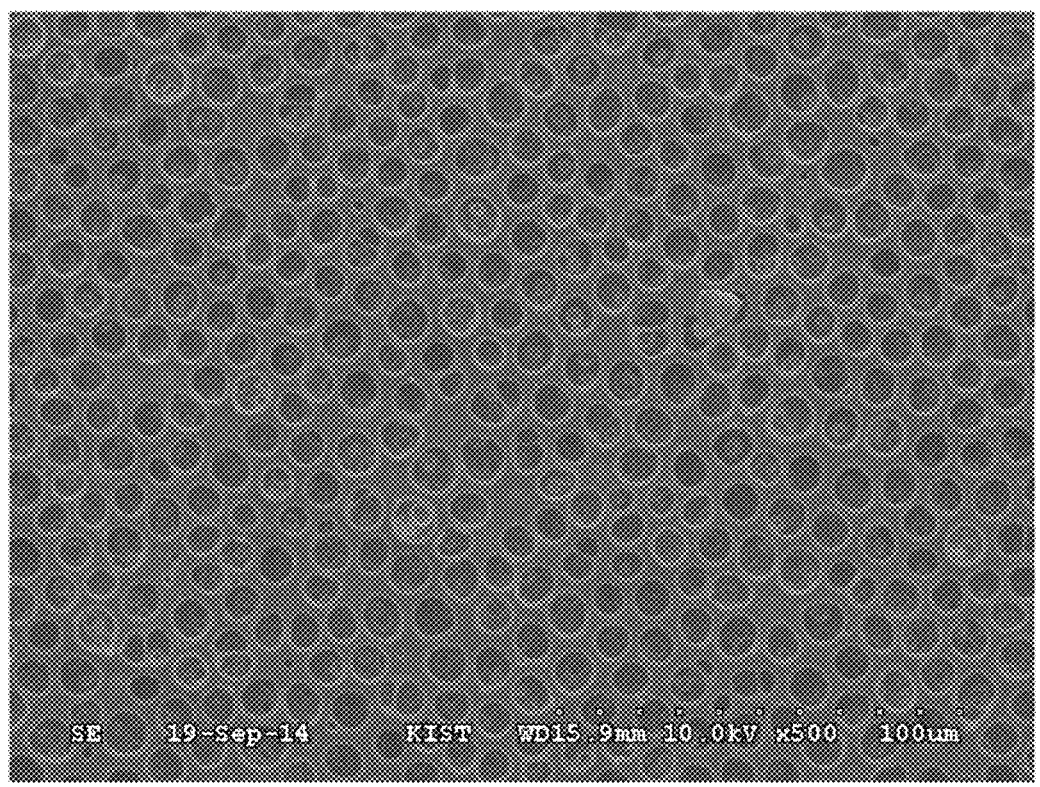
Figure 7B:
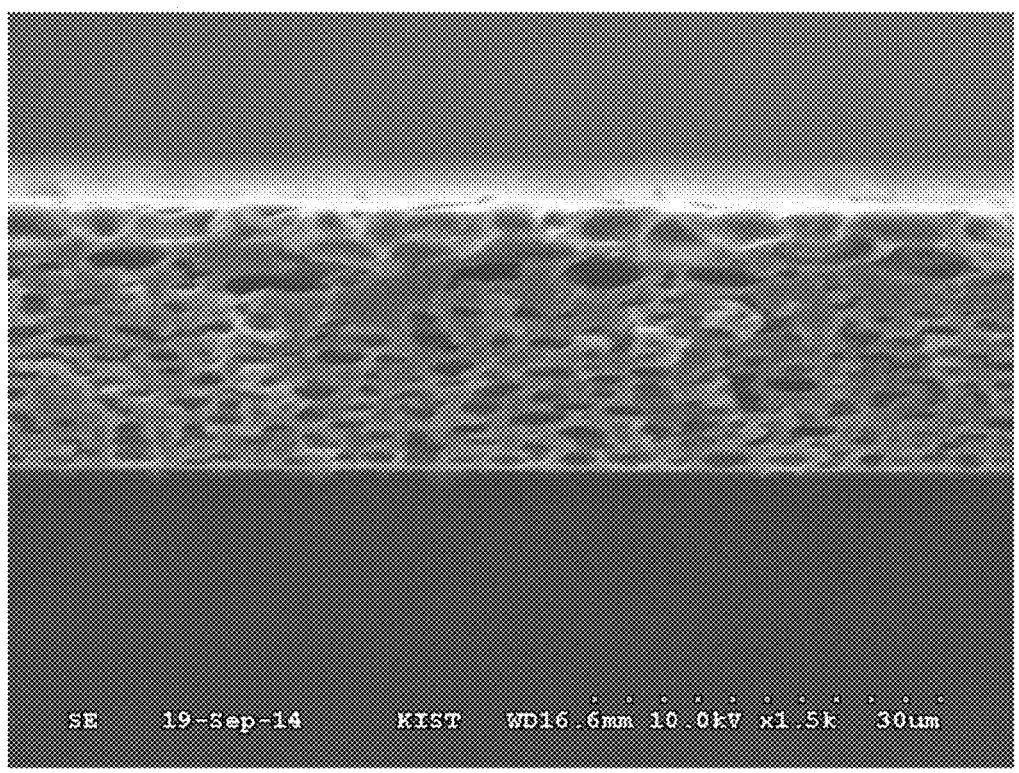
Figure 7C:
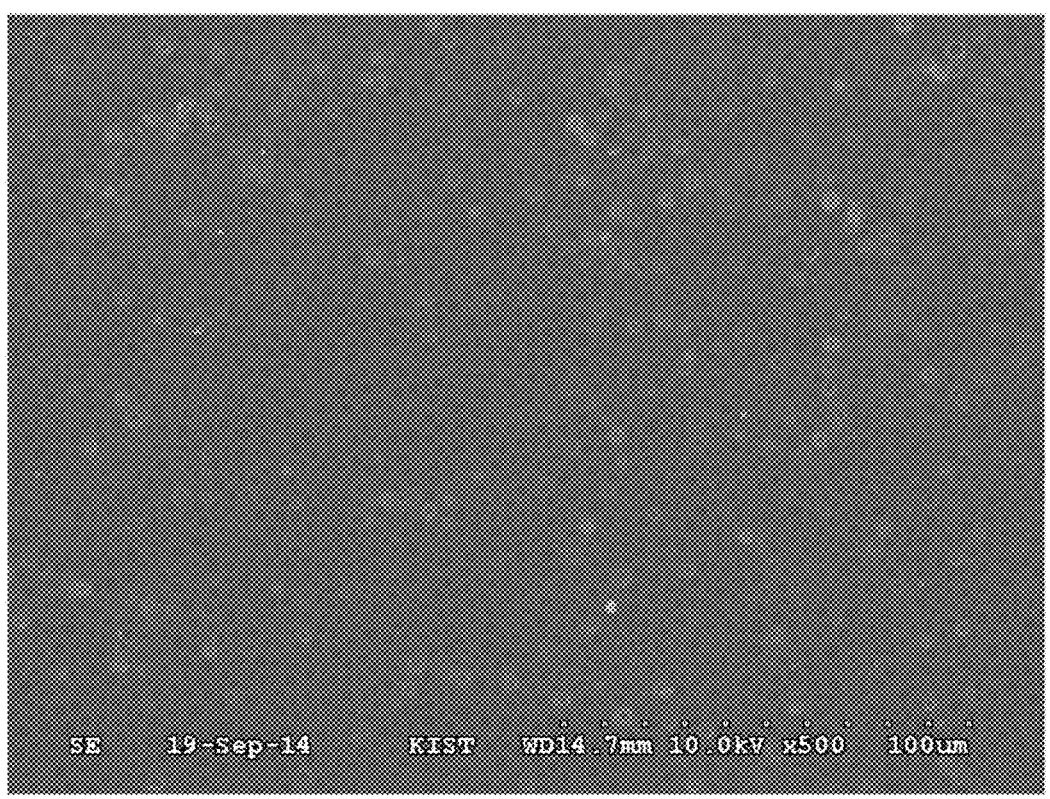

FIG. 7a-7c show SEM images of the Nafion membrane obtained according to Example 5, wherein FIG. 7a shows the air-side surface, FIG. 7b shows the section, and FIG. 7c shows the substrate (glass)-side surface.

As shown in FIG. 6 and FIG. 7, while a change in type of solvent results in a variation in pore structure, Examples 4 and 5 show a through-pore free structure in which pores are formed uniformly throughout the bulk of membrane without through-pores. When using a solvent having a boiling point similar to the boiling point of ethanol, it is possible to obtain a similar pore structure.

On the contrary, when using a solvent, such as methanol and/or water, instead of ethanol, it is difficult to obtain a membrane itself.

Meanwhile, when another dispersion is prepared by adjusting the amount of Nafion to a smaller amount as compared to Example 1 (e.g. using 10.5 parts by weight of a non-solvent based on 100 parts by weight of a mixture containing 8 wt % of Nafion and 92 wt % of a solvent), a membrane is obtained but distortion such as tearing or deformation occurs in the membrane, and thus it is difficult to maintain the membrane shape.

In other words, when Nafion is used in an excessively small amount or a non-solvent is used in an excessively large amount as described above, distortion may occur in the membrane.

Therefore, in order to obtain a uniform pore structure having no through-pores throughout the bulk of a membrane while maintaining the membrane shape without distortion, it is required that the casting solution includes 10-11 parts by weight of a non-solvent based on 100 parts by weight of a mixture of Nafion with a solvent containing 9.5-10.5 wt % of Nafion and 89.5-90.5 wt % of a solvent.

Meanwhile, the porous Nafion membrane of Example 1 is determined for its water permeation quality.

A hole having a diameter of 8 mm is formed in the plastic screw cap of a vial and another hole is formed also in the originally sealed portion. A membrane is located inside the plastic screw of the vial and a sealant is applied. The vial is filled with water and positioned in an environmental chamber. The vial is weighted periodically and water flux is calculated. The membrane is tested for its air-side surface (PN-A) and glass substrate-side surface (PN-G).

The test is carried out at 70° C. under two different relative humidity conditions (9% and 50% RH). As a control (Comparative Example 3), a commercially available dense Nafion membrane (Nafion N211 membrane) is used. Each test is carried out three times.

Figure 8:
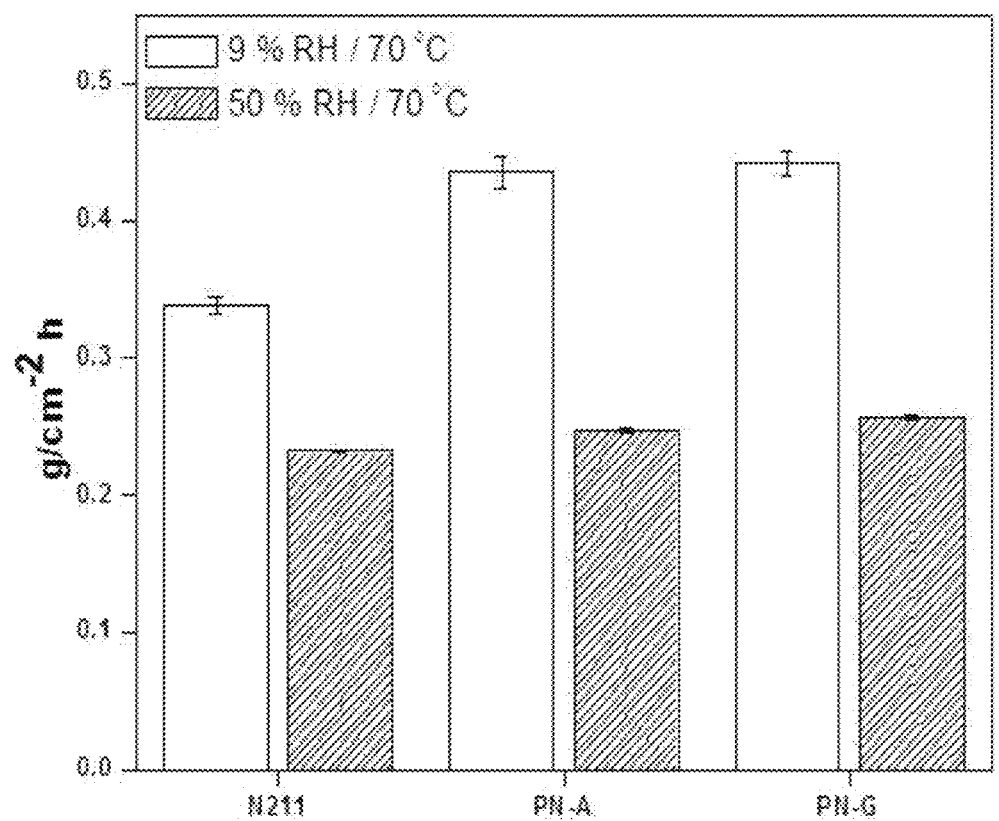
FIG. 8 is a graph illustrating the water flux results of the porous Nafion membrane obtained according to Example 1 as compared to the commercially available dense Nafion membrane (Nafion 211).

FIG. 8 is a graph illustrating the water flux results of the porous Nafion membrane obtained according to Example 1 as compared to the commercially available dense Nafion membrane (Nafion 211; shown as N211 in FIG. 8).

As shown in FIG. 8, the membrane according to Example 1 shows a high water flux under the low-humidity condition of the environmental chamber. In addition, the water flux increases in proportion to humidity. Further, the air-side surface (PN-A) and the glass substrate-side surface (PN-G) show a relatively higher water flux under the low-humidity condition as well as high-humidity condition, as compared to Comparative Example 3.

Figure 9:
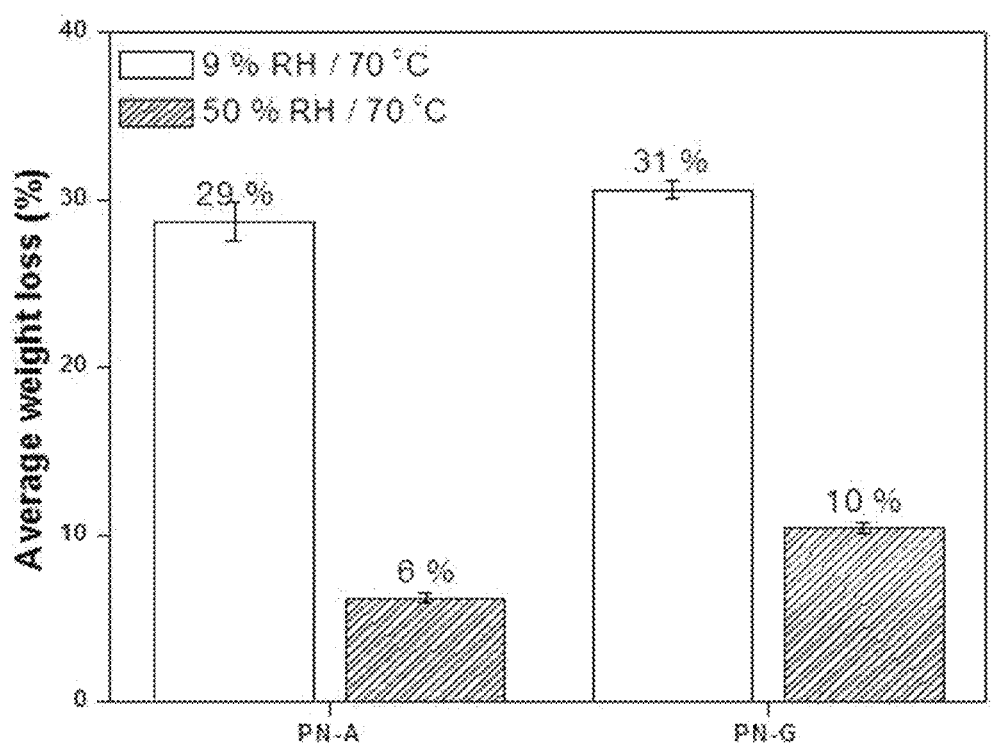
FIG. 9 is a graph illustrating the water flux differences at the air-side surface (PN-A) and at the glass substrate-side surface (PN-G) of the porous Nafion membrane obtained according to Example 1, based on the water flux of the commercially available Nafion membrane according to Comparative Example 3.

FIG. 9 is a graph illustrating the water flux differences at the air-side surface (PN-A) and at the glass substrate-side surface (PN-G) of the porous Nafion membrane obtained according to Example 1, based on the water flux of the commercially available Nafion membrane according to Comparative Example 3.

As shown in FIG. 9, the air-side surface (PN-A) shows a higher water flux by 29% and 6% under 9% RH and 50% RH, respectively, and the glass substrate-side surface (PN-G) shows a higher water flux by 31% and 10% under 9% RH and 50% RH, respectively, as compared to the water flux of the commercially available Nafion membrane.

What is claimed is:

1. A porous sulfonated tetrafluoroethylene polymer membrane, consisting essentially of:
    a surface; and
    a whole inner part,
    wherein the surface and the whole inner part of the sulfonated tetrafluoroethylene polymer membrane comprised of a monolithic porous structure, and the monolithic porous structure is a through-pore free structure,
    wherein open pores are distributed on both surfaces of the membrane and closed pores are distributed throughout the whole inner part of the membrane.

2. The porous sulfonated tetrafluoroethylene polymer membrane according to claim 1, wherein all pores of the monolithic porous structure show a pore size deviation within +100% and −98% from average pore size of the monolithic porous structure.

3. The porous sulfonated tetrafluoroethylene polymer membrane according to claim 1, wherein the monolithic porous structure has the largest pore diameter (LPD) not exceeding twice of the 90% average pore diameter ($APD_{90}$).

4. The porous sulfonated tetrafluoroethylene polymer membrane according to claim 1, wherein the monolithic porous structure has pores less than 20% of which are connected and 80% or more of which are not connected but separated from each other.

5. The porous sulfonated tetrafluoroethylene polymer membrane according to claim 1, wherein the porous Nafion membrane is an opaque white membrane.

6. The porous sulfonated tetrafluoroethylene polymer membrane according to claim 1, wherein the monolithic porous structure is obtained by a solvent evaporation process.

7. The porous sulfonated tetrafluoroethylene polymer membrane according to claim 1, wherein the porous sulfonated tetrafluoroethylene polymer membrane further comprises an additive that is an inorganic material, organometallic compound or a mixture thereof.

8. The porous sulfonated tetrafluoroethylene polymer membrane according to claim 7, wherein the additive is at least one selected from the group consisting of $TiO_2$, $SiO_2$, $CeO_2$, Pt, Pd, copper (II) phthalocyanin tetrasulfonic acid and copper (II) phthalocyanin tetrasulfonic acid tetrasodium salt.

9. The porous sulfonated tetrafluoroethylene polymer membrane according to claim 1, wherein the porous sulfonated tetrafluoroethylene polymer membrane further comprises an ion conductive polymer membrane formed thereon.

10. The porous sulfonated tetrafluoroethylene polymer membrane according to claim 9, wherein the ion conductive polymer membrane is a second sulfonated tetrafluoroethylene polymer membrane having an ion exchange capacity different from the ion exchange capacity of sulfonated tetrafluoroethylene polymer in the porous sulfonated tetrafluoroethylene polymer membrane; sulfonated polysulfone membrane; PBI membrane; or an anion conductive polymer membrane.

11. The porous sulfonated tetrafluoroethylene polymer membrane according to claim 1, wherein the porous sulfonated tetrafluoroethylene polymer membrane is for use in a fuel cell, sensor, electrolytic cell, redox flow batteries, gas separator or a humidifier.

* * * * *